Sept. 19, 1967 J. H. WESSELS 3,342,949

EDITING OF TAPE-RECORDED VIDEO SIGNALS

Filed April 5, 1963

INVENTOR.

JOHANNES H. WESSELS

BY

Frank R. Trifari

AGENT

United States Patent Office 3,342,949

Patented Sept. 19, 1967

3,342,949

EDITING OF TAPE-RECORDED VIDEO SIGNALS

Johannes Hendrik Wessels, Emmasingel, Eindhoven, Netherlands, assignor to North American Philips Company, Inc., New York, N.Y., a corporation of Delaware Filed Apr. 5, 1963, Ser. No. 270,864
Claims priority, application Netherlands, Apr. 9, 1962, 277,006
2 Claims. (Cl. 179—100.2)

This invention is concerned with magnetic recording and reproducing apparatus and in particular to such apparatus adapted to magnetically record and reproduce high frequency signals, such as video signals. The invention is more specifically concerned with the erasing or editing of the video signals.

One such device, designed to magnetically record video signals on a magnetic tape and to reproduce sginals from said tape, comprises a stationary cylindrical drum around which the moving tape is helically wound. The drum consists of two sections separated by a gap; one or more magnetic heads rotate in the gap and are located on the circumference of one or more rapidly rotating discs provided concentrically with the drum.

In such a video recorder, where the moving tape is helically wound around the drum, each recorded track corresponds to a video frame and forms an oblique angle with the longitudinal axis of the tape; each track is also relatively long compared with the width of the tape. It is evident that such a recording configuration of the tracks presents considerable difficulties when editing is necessary, as is almost always the case. Editing generally involves, from a particular point on the tape and extending for a desired interval, the replacement of a recorded portion by another portion; for example, a different text can be inserted or a defective portion replaced. The part which is not desired has to be erased and the new part inserted in its place. If the video frames are recorded on the tape as long oblique lines, as is the case in the device set forth above, mechanical editing by means of cutting and subsequent insertion of parts of the tape is extremely difficult if not impossible to accurately achieve. A transverse cut would destroy information which it is not desired to edit, while oblique cuts and subsequent inserts are difficult to make accurately.

The use of a stationary magnetic head for erasing, preliminary to editing, involves similar problems, albeit electrical rather than mechanical means are used. For instance, if it is desired to erase a portion from a particular frame on, the stationary erasing head would need to be at least as long as one of the long oblique lines mentioned above. Otherwise, not enough of a frame would be erased or portions of the recorded information would be erased which were desired to be retained.

An object of the invention is to provide accurate and effective means for editing particular portions of magnetic tape recorded by a device as set forth above.

Another object of the invention is to provide, in a recorder as set forth above, editing means which will approach as closely as possible the manner of recording and reproducing, in order to accurately effect erasing and subsequent re-recording of particular portions of the signal.

These and further objects of the invention, together with its various features and embodiments, will become apparent from the following description thereof when taken in conjunction with the accompanying drawing in which.

Figure 1:
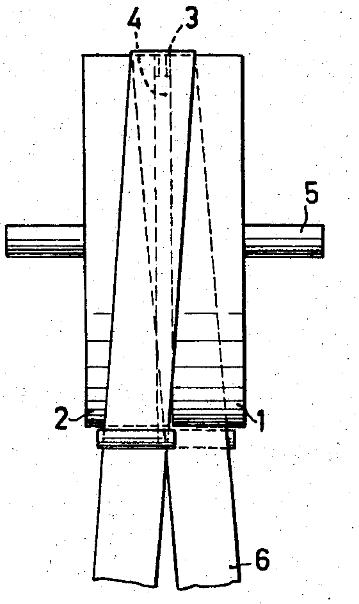
FIG. 1 is a schematic representation of a video recorder for recording and reproducing video signals.

Referring now to the figures, wherein like reference numerals denote like parts, referenec numerals 1 and 2 in FIG. 1 denote two sections of a stationary drum defining a gap 3 therebetween in which a rapidly rotating disc 4 is located. Disc 4 may be rotated by means of shaft 5 to which it is affixed, or it may be rotated by other means, the specific manner of achieving rotation forming no part of the invention. A magnetic tape 6, which is known in the art and generally consists of an insulating layer on which is placed a layer of magnetizable material, is moved over the sections 1 and 2 in the form of a helix in a manner such that it overlays the gap 3.

Figure 2:
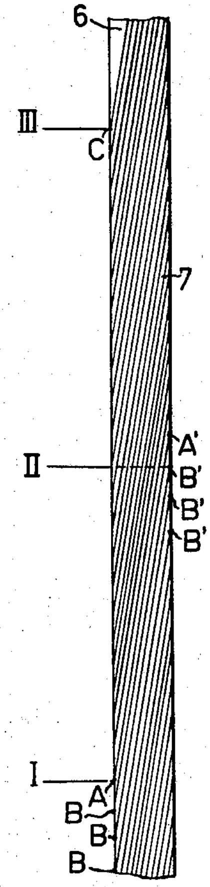
FIG. 2 is a representation of part of a magnetic tape on which signals have been recorded by a device such as that of FIG. 1.

As shown more particularly in the schematic representation of FIG. 2, video-frames are recorded on the tape 6 in the form of oblique lines 7; as can be seen, these lines are long compared with the width of the tape.

Assume that one desires to edit the recorded tape 6 and specifically that it is desired to edit the part of the recorded program which lies between the frame starting at point I and the one starting at point III; this part of the program begins with the frame indicated by A–A′. However, it is clear that at point I the full width of the recorded signals on the tape cannot be erased; if this were done, part of the oblique frame lines indicated by B–B′ would also be erased, and these contain information which is desired to be retained.

Figure 3:
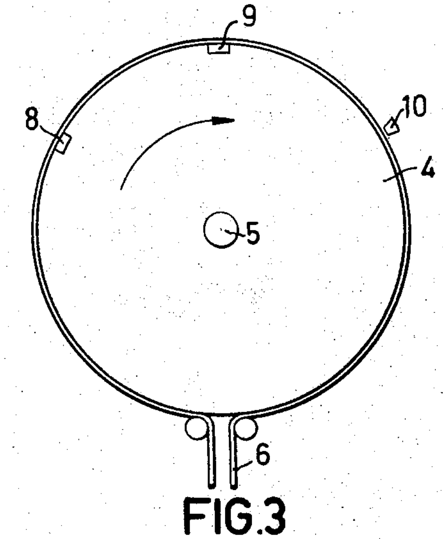
FIG. 3 is a side elevation view of a rapidly rotating disc with magnetic heads schematically shown thereon, which disc forms part of the device of FIG. 1.

In order to accomplish the erasure of only the portions of the information which it is desired to erase or edit, according to the invention an erasing head 9 is provided on the rapidly rotating disc 4 in addition to a recording head 8. A schematic representation of the rotating disc 4 with the magnetic heads thereon is shown in FIG. 3. As assumed direction of rotation of the disc, indicated by the arrow, is also shown in the figure. Reference numeral 8 denotes a recording head and it can be seen that erasing head 9 leads with respect to recording head 8 in the direction of rotation of the disc 4. In addition, erasing head 9 is displaced axially from recording head 8. The axial direction is taken as the longitudinal axis of the shaft 5 and a representation of the axial displacement of the heads is shown more clearly in FIG. 4. The nature of the axial displacement is set forth more fullly below.

The erasing head 9 may be supplied with direct current or with alternating current having a frequency greater than the frequency of the signals written by the recording head 9. The phenomenon of magnetic erasure by a magnetic head using alternating or direct current is known in the art and further discussion thereof is therefore unnecessary.

From the above it is seen that the moving erasing head 9 can erase all the oblique lines from line A–A′ onwards without erasing any portion of the lines below A–A′, indicated as B–B′ in FIG. 2. Further, due to the axial displacement of the recording head 8 with respect to the erasing head 9, the recording head can immediately re-record information along exactly the same lines as erased by the erasing head 9. If desired, this process can be continued up to and including the frame starting at point III on the tape; it will be recalled that editing was desired from the frame starting at point I to that starting at point III.

However, an examination of the tape and the lines shown in FIG. 2 shows that at point II there occurs the end of the last line containing information which is desired to be retained; in other words, at point II there occurs the last trace of the line B–B′ immediately preceding the line A–A'. Thus, from point II to point III, the entire recording across the width of the tape is to be erased. Under these conditions, according to the invention the erasure may be taken over by a stationary erasing head 10 shown in FIG. 3, the frontal portion of which has a width covering the full width of the tape; the stationary head 10 may be supplied with direct current or with alternating current similar to head 9. The starting point of the last line to be erased is indicated at point II and this line proceeds obliquely further upwardly at the part of the tape which starts at point III. Thus, from point III onward only part of the tape width is erased. Therefore, when using the stationary erasing head 10, the stationary head is cut out when point III is reached, with the rotating erasing head 9 again taking over the erasure at point III.

Figure 4:
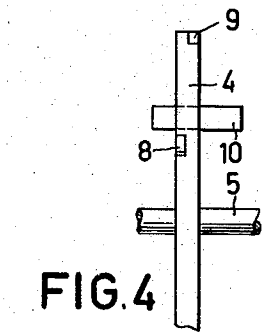
FIG. 4 is a side elevation of the rapidly rotating disc showing the relative axial displacement of the recording and erasing heads.

The axial displacement of the heads 8 and 9 is shown schematically in FIG. 4. The displacement shown in FIG. 4 is, of course, exaggerated. The erasing head 9 is displaced axially with respect to the associated recording head 8 through such a distance that the influence of the displacement of the tape during the time ensuing between erasing and recording is removed. The tape displacement is due to the fact that the tape passes helically over the drum. As a result of the displacement of the head 9 according to the invention it is possible to use a relatively narrow erasing head which erases entirely the long oblique frame lines of the program to be erased while the recording head records in the same space occupied by the line which has been erased. The actual amount of axial displacement of the erasing head with respect to the recording head is a matter of engineering design and depends upon the pitch of the tape on the drum, the speed of the tape, the circumferential speed of the rotating disc and the angle between the recording head and the erasing head. Stationary erasing head 10 is also shown schematically in FIG. 4.

Thus, it is seen that with the construction described above, it is possible to entirely erase a part of a program without erasing information which one desires to retain, and a new program can be inserted on the erased portions immediately after erasing. The difficult and costly procedure of mechanically cutting and joining the tape is thus obviated.

While the invention has been described with respect to preferred embodiments, various modifications thereof will be readily apparent to those skilled in the art without departing from the inventive concept, the scope of which is set forth in the appended claims.

What I claim is:

1. A magnetic recording and reproducing device comprising: a stationary cylindrical drum composed of two sections having an axis with a gap between the sections, a disc concentric with said drum located in said gap, means for rapidly rotating said disc, a magnetic tape adapted to move in a helical path around a portion of the periphery of said drum, a magnetic recording head located on the circumference of said disc, a magnetic erasing head also located on the circumference of said disc, said heads magnetically co-acting with said tape, said erasing head leading said recording head in the direction of disc rotation, and a stationary erasing head located adjacent to and magnetically co-acting with said tape, the width of the frontal portion of said stationary head being substantially the same as the width of said tape, said erasing head being axially displaced from said recording head through a distance such that the recording and erasing heads traverse the same lines on the tape.

2. A device as claimed in claim 1, wherein said moving and stationary erasing heads are supplied with an alternating current having a frequency higher than that of the highest frequency supplied to said recording head.

References Cited

UNITED STATES PATENTS 2,924,668 2/1960 Hoshino et al. ----- 179—100.2
3,042,756 7/1962 Buslik ------------ 179—100.2

BERNARD KONICK, *Primary Examiner.*

JAMES W. MOFFITT, A. I. NEUSTADT, *Assistant Examiners.*